US007898572B2

(12) United States Patent
Edwards et al.

(10) Patent No.: US 7,898,572 B2
(45) Date of Patent: Mar. 1, 2011

(54) METHODS AND APPARATUSES FOR IDENTIFYING OPPORTUNITIES TO CAPTURE CONTENT

(75) Inventors: Eric Edwards, San Jose, CA (US); Robert Sato, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1078 days.

(21) Appl. No.: 10/771,902

(22) Filed: Feb. 4, 2004

(65) Prior Publication Data

US 2005/0172147 A1 Aug. 4, 2005

(51) Int. Cl.
*H04N 5/232* (2006.01)
*H01L 23/58* (2006.01)
(52) U.S. Cl. .................. 348/211.2; 348/211.1; 257/629
(58) Field of Classification Search ................ 713/200; 348/211.2, 211.1; 257/629
See application file for complete search history.

(56) References Cited

U.S. PATENT DOCUMENTS

| | | | | |
|---|---|---|---|---|
| 6,396,537 B1* | 5/2002 | Squilla et al. | | 348/239 |
| 6,459,388 B1* | 10/2002 | Baron | | 340/996 |
| 6,516,154 B1 | 2/2003 | Parulski et al. | | |
| 6,526,234 B1 | 2/2003 | Malloy Desormeaux | | |
| 6,731,239 B2* | 5/2004 | Wall et al. | | 342/357.1 |
| 2001/0029459 A1 | 10/2001 | Fujiwara | | |
| 2003/0009281 A1* | 1/2003 | Whitham | | 701/211 |
| 2003/0020816 A1* | 1/2003 | Hunter et al. | | 348/231.3 |
| 2003/0140056 A1 | 7/2003 | Wall et al. | | |
| 2004/0174434 A1* | 9/2004 | Walker et al. | | 348/211.3 |

FOREIGN PATENT DOCUMENTS

| | | | |
|---|---|---|---|
| GB | 2403365 A | * | 12/2004 |
| JP | 11-55726 A | | 2/1999 |
| JP | 2001-36842 A | | 2/2001 |
| JP | 2001-216328 A | | 8/2001 |
| JP | 2001-289662 A | | 10/2001 |
| JP | 2001-306604 A | | 11/2001 |
| JP | 2002-214681 A | | 7/2002 |

OTHER PUBLICATIONS

Notification of Reason(s) for Refusal, Japanese Patent Office, Patent Application No. 2006-552258, issued Apr. 12, 2010 (translation) with claims, 9 sheets; counterpart to PCT/US2005/003547 claiming priority to U.S. Appl. No. 10/771,902.
Notification of Reason(s) for Refusal, Japanese Patent Office, Patent Application No. 2006-552258, Nov. 2010, translation (pp. 1/3 through 3/3) with claims (pp. 19 through 22); counpterpart to PCT/US2005/003547 claiming priority to U.S. Appl. No. 10/771,902.

* cited by examiner

*Primary Examiner*—Kaveh Abrishamkar
(74) *Attorney, Agent, or Firm*—John P. O'Banion

(57) ABSTRACT

In one embodiment, the methods and apparatuses identifying opportunities to capture content sense a user profile; determine a geographic location of a device; and transmit at least one suggestion to the device based on the geographic location of the device and the user profile wherein the suggestion indicates a photo opportunity.

17 Claims, 5 Drawing Sheets

METHODS AND APPARATUSES FOR IDENTIFYING OPPORTUNITIES TO CAPTURE CONTENT

FIELD OF THE INVENTION

The present invention relates generally to identifying opportunities to capture content and, more particularly, to identifying opportunities to capture content based on location.

BACKGROUND

With the use of electronic image capturing devices, there has been a proliferation of images that have been recorded by users. Users typically record content that captures their interests. In one example, a user utilizes the image capturing device to record images of historic buildings while on vacation. The content captured by users includes video tracks, graphic images, and photographs.

In some cases while sightseeing on vacation, the user may not be aware of an opportunity to record sights nearby that interest the user. For example, the user may be visiting a historic building with a city. While visiting, the user is able to capture images of this historic building. Because the visitor is not familiar with this city, the user may not realize that another historic building is located several blocks away. Had the user known that a similar historic building was only several blocks away, the user would have visited this additional historic building as well.

SUMMARY

In one embodiment, the methods and apparatuses identifying opportunities to capture content sense a user profile; determine a geographic location of a device; and transmit at least one suggestion to the device based on the geographic location of the device and the user profile wherein the suggestion indicates a photo opportunity.

BRIEF DESCRIPTION OF THE DRAWINGS

The accompanying drawings, which are incorporated in and constitute a part of this specification, illustrate and explain one embodiment of the methods and apparatuses for identifying opportunities to capture content. In the drawings.

DETAILED DESCRIPTION

The following detailed description of the methods and apparatuses for identifying opportunities to capture content refers to the accompanying drawings. The detailed description is not intended to limit the methods and apparatuses for identifying opportunities to capture content. Instead, the scope of the methods and apparatuses for identifying opportunities to capture content is defined by the appended claims and equivalents. Those skilled in the art will recognize that many other implementations are possible, consistent with the present invention.

References to "content" includes data such as photographs, images, video, text, graphics, and the like, that are embodied in digital or analog electronic form.

References to "electronic device" includes a device such as a digital still camera, a video camera, a personal digital assistant with an ability to capture an image, a cellular device with an ability to capture an image, and any electronic device with an ability to capture an image.

Figure 1:
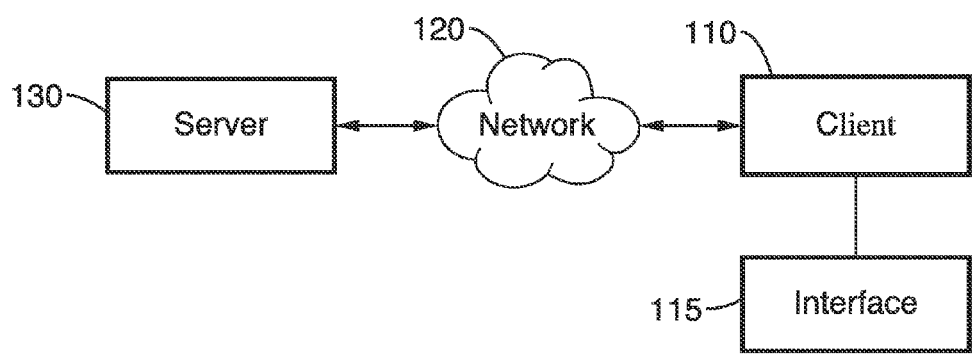
FIG. 1 is a diagram illustrating an environment within which the methods and apparatuses for synchronizing and tracking content are implemented.

FIG. 1 is a diagram illustrating an environment within which the methods and apparatuses for identifying opportunities to capture content are implemented. The environment includes an electronic device 110 (e.g., a computing platform configured to act as a client device, such as a computer, a personal digital assistant, a cellular telephone, a camera device), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing as personal digital assistant electronics (e.g., as in a Clie® manufactured by Sony Corporation). In other embodiments, one or more user interface 115 components (e.g., a keyboard, a pointing device (mouse, trackball, etc.), a microphone, a speaker, a display, a camera) are physically separate from, and are conventionally coupled to, electronic device 110. The user utilizes interface 115 to access and control content and applications stored in electronic device 110, server 130, or a remote storage device (not shown) coupled via network 120.

In accordance with the invention, embodiments of identifying opportunities to capture content as described below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

The methods and apparatuses for identifying opportunities to capture content are shown in the context of exemplary embodiments of applications in which content is suggested and identified based on the location of the electronic device. In one embodiment, the user utilizes content through the electronic device 110 and the network 120. In another embodiment, the content is tracked and synchronized by the application that is located within the server 130 and/or the electronic device 110.

In one embodiment, the methods and apparatuses for identifying opportunities to capture content is configured to provide a device with a list of suggestions based on a user profile and a location of the device. In one instance, the list of suggestions is selected from a photo opportunity database. Additionally, the user profile includes the type of content of interested by the user of the device in one embodiment.

In one embodiment, the methods and apparatuses for identifying opportunities to capture content is configured to provide detailed information corresponding to a selection from the list of suggestions. In one instance, the detailed information includes directions to the selection. In another instance, the detailed information includes detailed, dynamic directions to the selection based on the real-time location of the device. In one embodiment, the detailed information includes sample images and text describing the selection.

In one embodiment, the methods and apparatuses for identifying opportunities to capture content automatically updates the user profile based on the image(s) captured by the device.

Figure 2:
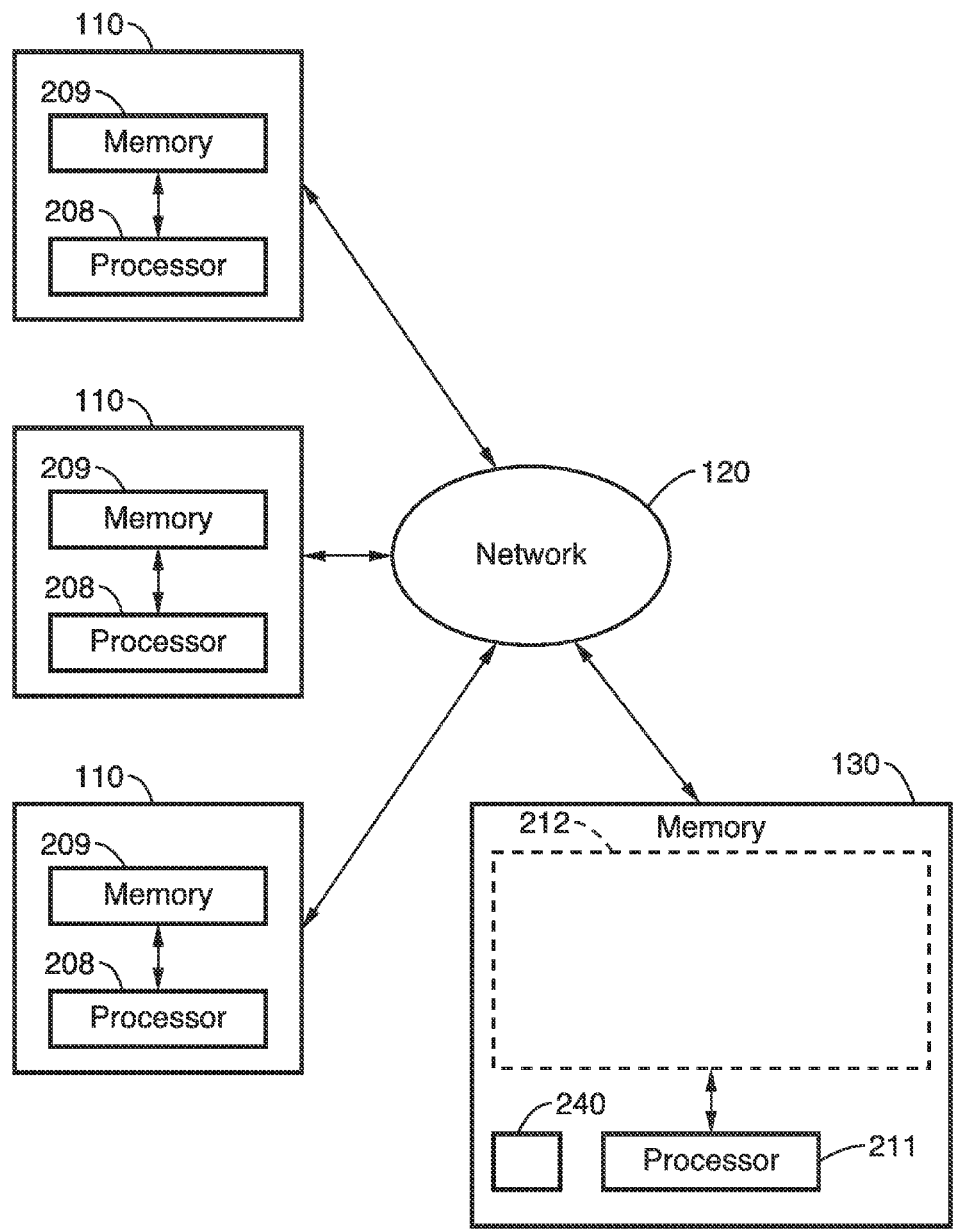
FIG. 2 is a simplified block diagram illustrating one embodiment in which the methods and apparatuses for identifying opportunities to capture content are implemented.

FIG. 2 is a simplified diagram illustrating an exemplary architecture in which the methods and apparatuses for identifying opportunities to capture content are implemented. The exemplary architecture includes a plurality of electronic devices 110, a server device 130, and a network 120 connecting electronic devices 110 to server 130 and each electronic device 110 to each other. The plurality of electronic devices 110 are each configured to include a computer-readable medium 209, such as random access memory, coupled to an electronic processor 208. Processor 208 executes program instructions stored in the computer-readable medium 209. A unique user operates each electronic device 110 via an interface 115 as described with reference to FIG. 1.

Server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

The plurality of client devices 110 and the server 130 include instructions for a customized application for identifying opportunities to capture content. In one embodiment, the plurality of computer-readable medium 209 and 212 contain, in part, the customized application. Additionally, the plurality of client devices 110 and the server 130 are configured to receive and transmit electronic messages for use with the customized application. Similarly, the network 120 is configured to transmit electronic messages for use with the customized application.

One or more user applications are stored in memories 209, in memory 211, or a single user application is stored in part in one memory 209 and in part in memory 211. In one instance, a stored user application, regardless of storage location, is made customizable based on identifying opportunities to capture content as determined using embodiments described below.

Figure 3:
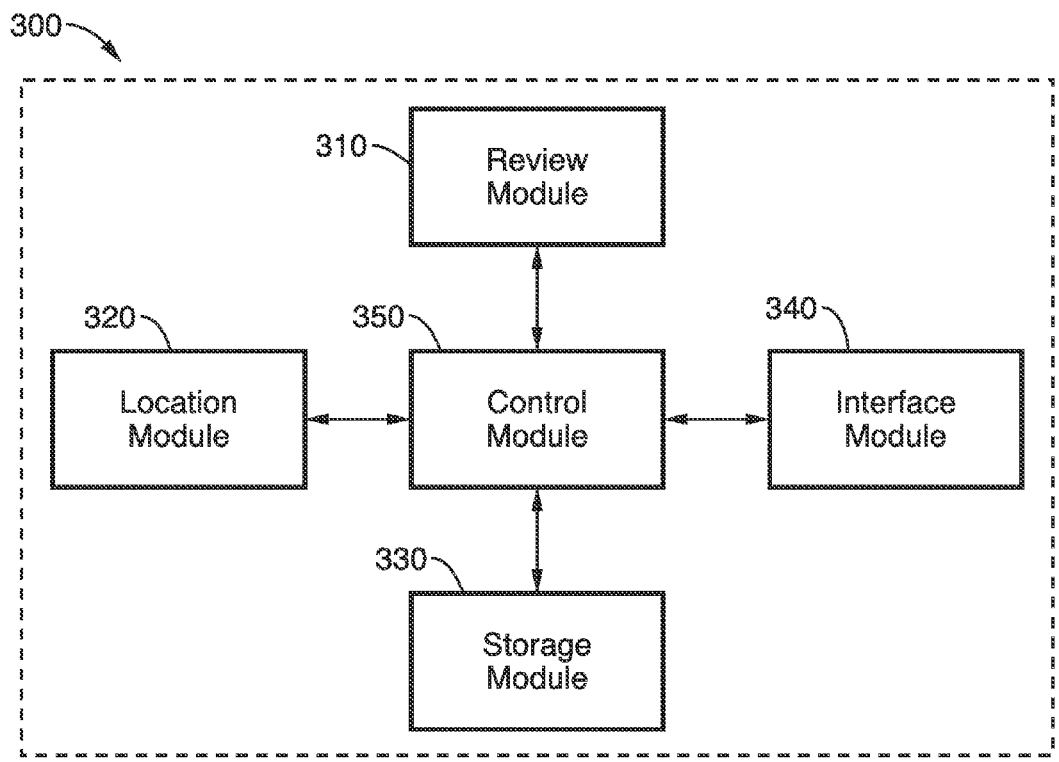
FIG. 3 is a simplified block diagram illustrating a system, consistent with one embodiment of the methods and apparatuses for identifying opportunities to capture content.

FIG. 3 illustrates one embodiment of an identifying system 300. The identifying system 300 includes a review module 310, a location module 320, a storage module 330, an interface module 340, and a control module 350. In one embodiment, the control module 350 communicates with the review module 310, the location module 320, the storage module 330, and the interface module 340.

In one embodiment, the control module 350 coordinates tasks, requests, and communications between the review module 310, the location module 320, the storage module 330, and the interface module 340.

In one embodiment, the review module 310 analyzes a profile associated with a user of the electronic device 110. In one embodiment, the profile includes different content types of pictures captured by the user. For example, the user of the electronic device 110 captures pictures of monuments, scenic landscapes, churches, historical buildings, and the like.

In another embodiment, the review module 310 identifies possible picture opportunities from selecting from a picture opportunity database based in part on the profile. In one embodiment, the picture opportunity database includes a listing of opportunities to capture a photograph and is organized by geography area and content type. For example, a church located in San Francisco, Calif. is listed as a photograph opportunity within the picture opportunity database. In this example, this listed church can be classified as a church, a historical building, a monument, and the like for content type within the picture opportunity database. In addition, this listed church can also be classified under "San Francisco" under geography area within the picture opportunity database.

In yet another embodiment, the review module 310 creates a profile for the user based on the photographs captured by the user. For example, the review module 310 reviews prior photographs captured by the user through the electronic device 110.

In yet another embodiment, the review module 310 updates an existing profile based on additional photographs captured by the user. For example, the review module 310 monitors the photographic activity of the user through the electronic device 110.

In one embodiment, the location module 320 identifies a location of the electronic device 110. In one embodiment, the location module 320 receives information identifying the location of the electronic device 110 and makes the location information available to the review module 310. In one embodiment, the location of the electronic device is determined through a system of satellites such as a global positioning system (GPS). In another embodiment, the location of the electronic device 110 is determined locally by multiple sensors which pin point the device's location.

In yet another embodiment, the location of the electronic device 110 is determined by sensing the electronic device 110 within a general area. For example, the electronic device 110 is sensed entering an entrance gate at an amusement park. In this embodiment, the location module 320 senses that the electronic device 110 is within the amusement park. Although, the exact location of the electronic device 110 is not available, the location module 320 ascertains the general area of the electronic device 110.

In one embodiment, the storage module 330 stores a profile associated a user of the electronic device 110. In another embodiment, the storage module 330 also stores the picture opportunity database.

In one embodiment, the interface module 340 detects an action such as capturing a photograph through the electronic device 110.

In another embodiment, the interface module 340 transmits different possible selection choices from the picture opportunity database.

In yet another embodiment, the interface module 340 interacts with user regarding the user's selection from the picture opportunity database.

In another embodiment, the interface module 340 interacts with other devices. For example, in one instance, the interface module 340 interacts with a GPS system for receiving geographical information regarding the electronic device 110.

The identifying system 300 in FIG. 3 is shown for exemplary purposes and is merely one embodiment of the methods and apparatuses for identifying opportunities to capture content. Additional modules may be added to the system 300 without departing from the scope of the methods and apparatuses for sequestering content. Similarly, modules may be combined or deleted without departing from the scope of the methods and apparatuses for identifying opportunities to capture content.

Figure 4:
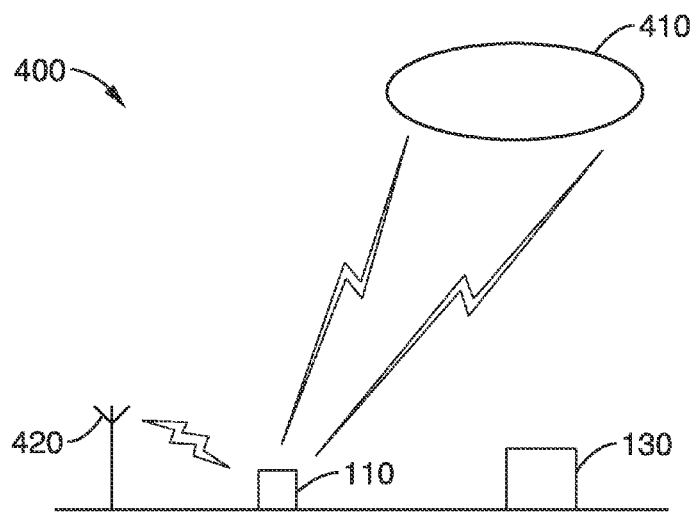
FIG. 4 is a simplified block diagram illustrating one embodiment in which the methods and apparatuses for identifying opportunities to capture content.

FIG. 4 illustrates a simplified overview system 400 for identifying opportunities to capture images. The system 400 includes an electronic device 110, a server 130, locator system 410, and a wireless network 420. The record 400 is associated with a specific content.

In one embodiment, the electronic device 110 captures images under the direction of a user. In one instance, the electronic device 110 receives suggestions for opportunities to capture images based on the location of the electronic device 110 and the unique profile of the user. In another instance, the electronic device 110 provides detailed instructions about a particular opportunity of interest based on the selection of the user from the multiple suggestions.

In one embodiment, the server 130 monitors the electronic device 110 and provides the electronic device 110 with suggestions for opportunities to capture images. In one instance, the server 130 maintains the unique profile for each user and the picture opportunity database. In another instance, the server 130 detects activity of the electronic device 110 and updates the profile for the user. In another instance, the server 130 monitors the location of the electronic device 110.

In one embodiment, the locator system 410 determines the geographical location of the electronic device 110. In one instance, the locator system 410 is a GPS system that utilizes multiple satellites to track the location of the electronic device throughout the world. In another instance, the locator system 410 comprises multiple local sensors to track the location of the electronic device 110 within a localized area.

In one embodiment, the locator system 410 communicates with the server 130 through the electronic device. In another embodiment, the locator system 410 communicates directly with the electronic device 110.

In one embodiment, the wireless network 420 facilitates communication between the electronic device 110 and the server 130. In one embodiment, the wireless network 420 is a cellular network. In another embodiment, the wireless network 420 is a wide area network.

Figure 5:
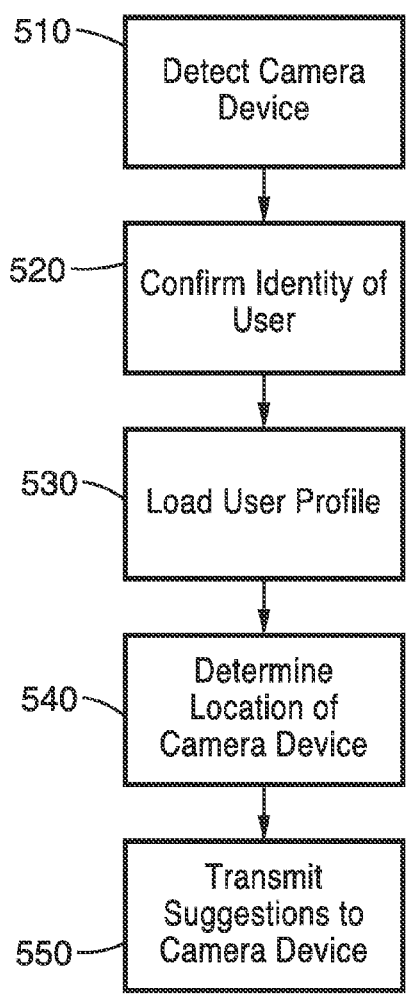
FIG. 5 is a flow diagram consistent with one embodiment of the methods and apparatuses for identifying opportunities to capture content.
Figure 6:
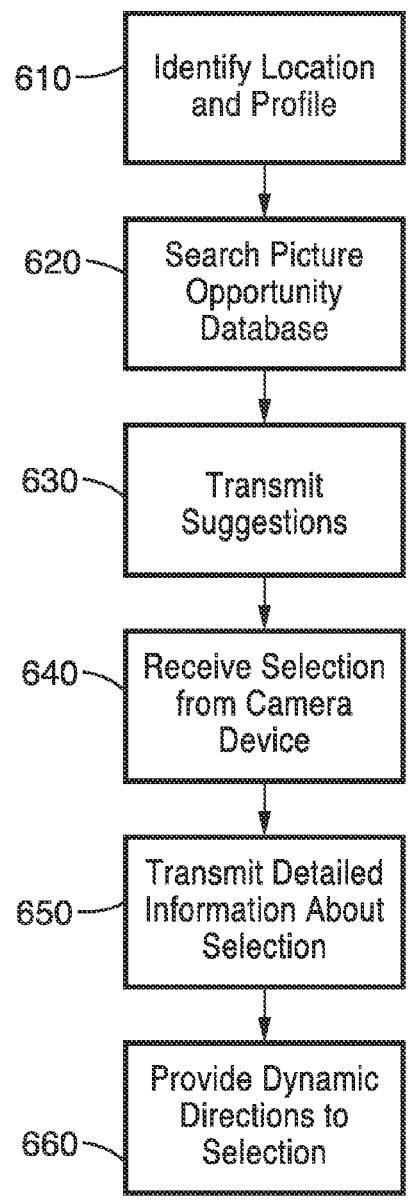
FIG. 6 is a flow diagram consistent with one embodiment of the methods and apparatuses for identifying opportunities to capture content.
Figure 7:
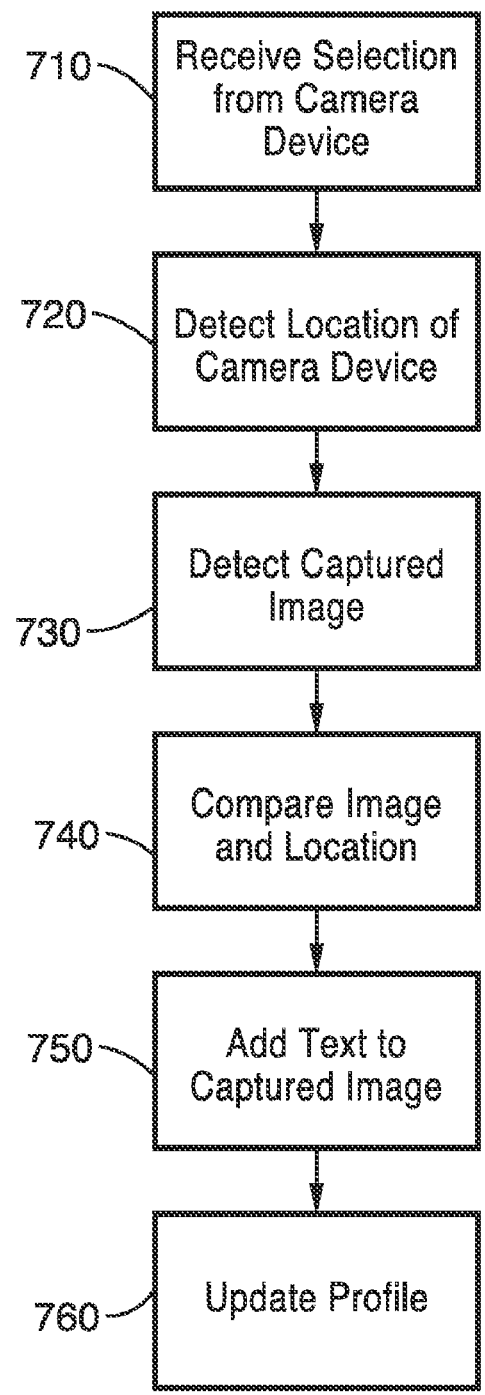
FIG. 7 is a flow diagram consistent with one embodiment of the methods and apparatuses for identifying opportunities to capture content.

The flow diagrams as depicted in FIGS. 5, 6, and 7 are one embodiment of the methods and apparatuses for synchronizing and tracking content. The blocks within the flow diagrams can be performed in a different sequence without departing from the spirit of the methods and apparatuses for synchronizing and tracking content. Further, blocks can be deleted, added, or combined without departing from the spirit of the methods and apparatuses for synchronizing and tracking content.

The flow diagram in FIG. 5 illustrates identifying opportunities to capture content according to one embodiment of the invention. In Block 510, a camera device is detected. In one embodiment, the server 130 detects the camera device.

In Block 520, a user's identity is determined. In one embodiment, the user interfaces with the camera device detected within the Block 510. The user may be identified in numerous ways. In one instance, the user is identified through a password. In another instance, the user is identified through a biometric parameter such as a fingerprint, a DNA sample, an iris scan, and the like. In yet another instance, the user is identified through the use of a specific camera device.

In Block 530, a unique profile corresponding to the user's identity is loaded within the system 300. In one embodiment, the unique profile is loaded among a plurality of profiles associated with other users. In one embodiment, the profile indicates the content types that the user has expressed interest. For example, the profile reflects that the user shows interest in content such as historic buildings, hot rod automobiles, and the like. In one instance, the content types range from general categories such as "buildings" to more refined subsets such as "interiors of cathedrals" being a subset of "buildings". In other examples, any number of labels are utilized to describe the various content types that are listed within a profile.

In Block 540, a location of the camera device is determined. In one embodiment, the location of the camera device is performed by the locator system 410. In one instance, the locator system 410 determines the general location of the camera device without finding the exact location. For example, for determining a generalized location of the camera device, a single cellular site is sufficient for detecting the camera device within a generalized area such as within a particular city.

In another instance, the locator system 410 determines a specific location of the camera device through a GPS system such as at a particular street address. In one instance, the location of the camera device is determined within 3 feet.

In Block 550, suggestions are transmitted to the camera device. In one embodiment, these suggestions give the user choices for photographic opportunities based on the location of the camera device and the interests of the user.

The flow diagram in FIG. 6 illustrates identifying opportunities to capture content according to one embodiment of the invention.

In Block 610, a unique profile is identified and the location of the camera device is also identified.

In Block 620, a search is conducted within the picture opportunity database based on the unique profile and the location of the camera device. In one embodiment, if the location of the camera is within a city such as San Francisco, then, the photographic opportunities listed within the picture opportunity is limited to listings in San Francisco. In another embodiment, the photographic opportunities listed within the picture opportunity is limited to listings in San Francisco Bay Area. In yet another embodiment, the photographic opportunities listed within the picture opportunity is limited to listings in Northern California.

In one embodiment, the listings within the picture opportunity database are narrowed and refined based on the unique profile. For example, if the unique profile reflects that historic buildings are of interest, then the listings with the content type related to historical buildings are retained.

In one embodiment, the number of retained listings ideally would not overwhelm the camera device while still providing the camera device with choices to select. For example, in one instance, having between 5 to 10 listings from the picture opportunity database allows enough choices without overwhelming the user and the camera device.

There are a variety of ways to limit or expand the number of listing transmitted to the camera device. In one embodiment, the radius of geographical limits is dynamically varied to keep the number of listings offered to the camera device reasonable. For example, the geographic radius is enlarged when there are not enough listings to present to the camera device. In another example, the geographic radius is decreased when there are too many listings to present to the camera device.

Further, the content type is expanded and broadened when there are not enough listings to present to the camera device in one embodiment. In this instance, instead of selecting "historic buildings" as the content type, "buildings" is utilized as the content type. Similarly, the content type is narrowed when there are not enough listings to present to the camera device in one embodiment. In this instance, instead of selecting "historic buildings" as the content type, "historic buildings in historic areas" is utilized as the content type.

Further, the content type is expanded and broadened when there are not enough listings to present to the camera device in one embodiment. In this instance, instead of selecting "historic buildings" as the content type, "buildings" is utilized as the content type.

In Block 630, the listings identified in the Block 620 are suggestions that are transmitted to the camera device.

In Block 640, a particular selection from one of the suggestions is received from the camera device. In one embodiment, the selection requests additional suggestions for the camera device. In this instance, additional suggestions are identified in the Block 620 and these additional suggestions are transmitted to the camera device in the Block 630.

In another embodiment, the selection identifies one of the suggestions transmitted in the Block 630.

In Block 650, detailed information related to the selected suggestion is transmitted to the camera device. In one embodiment, the detailed information is stored within the storage module 330. In one embodiment, the detailed information includes directions on how to reach this photographic opportunity, notes describing the environment of the opportunity, sample images to emulate, sample images with common mistakes, and the like.

In Block 660, dynamic directions are transmitted to the camera device based on the real-time location of the camera device. For example, the dynamic directions are transmitted to the camera device calling out real-time directions of "turn right at the next light", "make a u-turn here", and the like.

The flow diagram in FIG. 7 illustrates customizing photographs captured by the camera device according to one embodiment of the invention. In Block 710, a particular selection from one of the suggestions is received from the camera device.

In Block 720, a location of the camera device is determined. In one embodiment, the location of the camera device is performed by the locator system 410.

In Block 730, a captured image recorded by the camera device is detected. In one embodiment, the captured image is recorded by the camera device at the location determined in the Block 720.

In Block 740, the image captured by the camera device and the location of the camera device when the image was captured is compared with information related to the particular selection within the Block 710.

In one embodiment, the information related to the particular selection is stored within the storage module 310 within the picture opportunity database. For example, in one instance, the picture opportunity database includes information related to the particular selection such as a location, sample images, descriptive text associated with the sample images.

In one embodiment, the location of the camera device when the image was captured is compared to the location of the particular selection. If the camera device was located outside the area of the particular selection when the image was captured, then this image does not correspond to the sample images associated with the particular selection.

In one embodiment, the captured image is compared with the sample images stored within the picture opportunity database associated with the particular selection. In one instance, commercially available image recognition and comparison algorithms are utilized to determine a sufficient match between the captured image and one of the sample images.

In Block 750, text associated with the sample image is selectively added to the captured image. In one embodiment, the text associated with the sample image is stored within the picture opportunity database. In one embodiment, the text associated with the sample image describes details of the captured image such as location of the sample image, description of the subject of the captured image, and the like.

In one embodiment, the text associated with the sample image is added to the captured image when the captured image is recorded by the camera device in a location that corresponds with the particular selection. In another embodiment, the sample image is added to the captured image when the captured image matches the sample image.

In Block 760, the profile corresponding to the user of the camera device is updated according to the captured image. For example, the captured image that is detected in the Block 730 is utilized to refine the profile associated with the user of the camera device.

In one embodiment, the captured image is matched with a sample image corresponding to the particular selection from the comparison in the Block 740. In this instance, the content type associated with the sample image is utilized to update the profile corresponding to the user of the camera device.

In another embodiment, the captured image does not correspond to a sample image and is independently matched to a content type. For example, since the captured image does not correspond to any of the sample images, the captured image is examined to match a content type unique to the captured image.

The foregoing descriptions of specific embodiments of the invention have been presented for purposes of illustration and description. For example, the invention is described within the context of suggesting photo opportunities and capturing images as merely one embodiment of the invention. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method of identifying photographic opportunities, comprising:

maintaining a user profile describing the photographic interests of a user as content types selected from a number of content type categories within which the user has expressed interest;

wherein said content type specifies the category, or kind, of photo opportunity in which the user is interested;

determining a geographic location of a device;

identifying a plurality of suggestions from a photo opportunity database based on the geographic location of the device and matching of photographic interests as given by said content types within said user profile with the content type of the photo opportunity, wherein each suggestion indicates a unique photo opportunity;

transmitting the plurality of photo opportunity suggestions to the device;

receiving a user selection from the device chosen from the plurality of suggestions; and transmitting additional information to the user regarding the selected photo opportunity to the device.

2. A method as recited in claim 1, wherein said content type categories for representing user interests comprises general categories of content types as well as subsets of the general categories of content types within said user profile.

3. A method as recited in claim 1, wherein said identifying a plurality of suggestions generates a desired number of listings in response to dynamically varying the radius of geographic limits.

4. A method as recited in claim 1, wherein the device is an image sensing device or a camera device.

5. A method as recited in claim 1, further comprising selecting at least one suggestion from said plurality of suggestions within a photo opportunity database wherein each suggestion includes a content type and a geographic location.

6. A method as recited in claim 5, further comprising adding additional suggestions to the at least one suggestion by widening an area around the geographic location of each suggestion that the device is found within, or by relaxing a requirement that the content type of each suggestion match the user profile.

7. A method as recited in claim 5, further comprising reducing a number of the at least one suggestion by tightening a requirement that the content type of each suggestion match the user profile.

8. A system for suggesting local photo opportunities, comprising:
    an interface module configured for receiving a geographical location of a camera device;
    a storage module configured for storing a user profile wherein the user profile includes at least one content type from a number of classification categories describing photographic interests of a user;
    wherein said content type specifies the category, or kind, of photo opportunity in which the user is interested; and
    a review module configured for providing at least one suggestion based on matching the content types within the user profile which expresses user interests and the content type of the photo opportunity for the geographical location of the camera device;
    wherein said review module updates the user profile based on prior photographs captured by the user through said camera device.

9. A system as recited in claim 8, wherein the interface module is configured for receiving a selection from the camera device wherein the selection is from at least one suggestion.

10. A system as recited in claim 9, wherein the interface module is configured to transmit a detailed description to the camera device wherein the detailed description corresponds to the selection.

11. A system as recited in claim 10, wherein the detailed description includes a sample image of the selection.

12. A system as recited in claim 10, wherein the detailed description includes a description of the selection.

13. A system as recited in claim 10, wherein the detailed description includes directions to the selection based on the geographic location of the camera device.

14. A system as recited in claim 9, wherein the storage module is configured to store a photo opportunity database that includes a plurality of photo opportunity listings wherein each listing is associated with a geographic area and a content type.

15. A computer-readable medium having computer executable instructions for performing a method of suggesting photo opportunities within a local area, comprising:
    sensing a user profile describing the photographic interests of a user as content types, selected from a number of content type categories;
    wherein said content type specifies the category, or kind, of photo opportunity in which the user is interested;
    determining a geographic location of a device;
    identifying a plurality of suggestions from a photo opportunity database based on the geographic location of the device and matching of the content type for prospective photo opportunities with the photographic interests of the user as represented by content types within said user profile, wherein each suggestion indicates a unique photo opportunity;
    transmitting the plurality of photo opportunity suggestions to the device;
    receiving a user selection from the device chosen from the plurality of suggestions which match user interests as defined by user selected content types in said user profile; and
    transmitting additional information to the user regarding the selected photo opportunity, corresponding to the selection, to the device.

16. A method as recited in claim 1, further comprising comparing the captured image with a stored sample image by executing image recognition and comparison algorithms to determine a match between the captured image and the sample image exists to associate information from the sample image to the captured image.

17. A method as recited in claim 16, further comprising adding content type or descriptive text from the sample image to the captured image in response to said sufficient level of matching being detected.

\* \* \* \* \*